United States Patent
Ananthanarayanan et al.

(10) Patent No.: US 8,824,314 B2
(45) Date of Patent: Sep. 2, 2014

(54) MAINTAINING AN ALLOCATION OF ANTENNAS AT AN ACCESS TERMINAL DURING A COMMUNICATION SESSION WITHIN A WIRELESS COMMUNICATIONS SYSTEM

(75) Inventors: Arulmozhi K. Ananthanarayanan, San Diego, CA (US); Bongyong Song, San Diego, CA (US); Biren R. Patel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 629 days.

(21) Appl. No.: 12/782,948

(22) Filed: May 19, 2010

(65) Prior Publication Data

US 2011/0122784 A1 May 26, 2011

Related U.S. Application Data

(60) Provisional application No. 61/180,628, filed on May 22, 2009.

(51) Int. Cl.
 *H04L 12/26* (2006.01)
 *H04W 4/00* (2009.01)
 *H04H 20/67* (2008.01)
 *H04W 88/06* (2009.01)
 *H04W 72/00* (2009.01)

(52) U.S. Cl.
 CPC .............. *H04W 88/06* (2013.01); *H04W 72/00* (2013.01)
 USPC .......................................... 370/252; 370/310

(58) Field of Classification Search
 USPC .......................................... 370/252, 334, 339
 See application file for complete search history.

(56) References Cited

U.S. PATENT DOCUMENTS

| 7,010,264 B1* | 3/2006 | Nguyen et al. ................ 455/3.02 |
| 7,411,974 B2 | 8/2008 | Attar et al. |
| 7,706,329 B2* | 4/2010 | Lindoff et al. ................ 370/332 |

(Continued)

FOREIGN PATENT DOCUMENTS

| CN | 101137217 A | 3/2008 |
| JP | 2006261894 A | 9/2006 |
| JP | 2008085793 A | 4/2008 |
| WO | WO-0150636 A1 | 7/2001 |
| WO | 2004045239 A2 | 5/2004 |
| WO | WO-2005122414 A1 | 12/2005 |
| WO | 2006017610 A1 | 2/2006 |
| WO | WO-2008149810 A1 | 12/2008 |

OTHER PUBLICATIONS

International Search Report and Written Opinion—PCT/US2010/035552, International Search Authority—European Patent Office—Aug. 25, 2010.

*Primary Examiner* — Kevin C Harper
*Assistant Examiner* — Peter Chen
(74) *Attorney, Agent, or Firm* — Michael F. Taveira

(57) ABSTRACT

Embodiments are directed to monitoring downlink communication at an access terminal within a wireless communications system. The access terminal monitors data on a first downlink broadcast channel of a first network at least with a primary antenna of the access terminal, the monitored data associated with an active communication session (e.g., a high-priority multicast communication session) of the access terminal. The access terminal may optionally periodically monitor messaging information on a downlink channel of a second network with a secondary antenna of the access terminal, the primary antenna having a higher sensitivity than the secondary antenna. The access terminal maintains an exclusive allocation of the primary antenna to the first network irrespective of a quality level of the periodically monitored messaging information on the downlink channel of the second network.

39 Claims, 7 Drawing Sheets

(56) References Cited

U.S. PATENT DOCUMENTS

| | | |
|---|---|---|
| 8,570,880 B2 | 10/2013 | Canoy et al. |
| 2005/0227631 A1* | 10/2005 | Robinett .......................... 455/83 |
| 2006/0089117 A1* | 4/2006 | Suzuki ......................... 455/269 |
| 2006/0189346 A1 | 8/2006 | Turner et al. |
| 2006/0281486 A1 | 12/2006 | Ngai et al. |
| 2008/0144585 A1* | 6/2008 | Stanwood et al. ............ 370/336 |
| 2008/0227414 A1* | 9/2008 | Karmi et al. .................. 455/101 |
| 2008/0311912 A1 | 12/2008 | Balasubramanian et al. |

* cited by examiner ial Application No. 61/180,628, entitled "MAINTAIN-
MAINTAINING AN ALLOCATION OF ANTENNAS AT AN ACCESS TERMINAL DURING A COMMUNICATION SESSION WITHIN A WIRELESS COMMUNICATIONS SYSTEM The present Application for Patent claims priority to Provisional Application No. 61/180,628, entitled "MAINTAINING AN ALLOCATION OF ANTENNAS AT AN ACCESS TERMINAL DURING A COMMUNICATION SESSION WITHIN A WIRELESS COMMUNICATIONS SYSTEM", filed May 22, 2009, assigned to the assignee hereof and hereby expressly incorporated by reference herein in its entirety.

BACKGROUND OF THE INVENTION

1. Field of the Invention

Embodiments of the present invention are directed to maintaining an allocation of antennas at an access terminal during a communication session within a wireless communications system.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (WCDMA), CDMA2000 (such as CDMA2000 1xEV-DO standards, for example) or TD-SCDMA.

In wireless communication systems, mobile stations, handsets, or access terminals (AT) receive signals from fixed position base stations (also referred to as cell sites or cells) that support communication links or service within particular geographic regions adjacent to or surrounding the base stations. Base stations provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the base stations generally interact with ATs through an over the air interface and with the AN through Internet Protocol (IP) network data packets.

In wireless telecommunication systems, Push-to-talk (PTT) capabilities are becoming popular with service sectors and consumers. PTT can support a "dispatch" voice service that operates over standard commercial wireless infrastructures, such as CDMA, FDMA, TDMA, GSM, etc. In a dispatch model, communication between endpoints (ATs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

Conventionally, data packets within a wireless communications network have been configured to be sent to a single destination or access terminal. A transmission of data to a single destination is referred to as "unicast". As mobile communications have increased, the ability to transmit given data concurrently to multiple access terminals has become more important. Accordingly, protocols have been adopted to support concurrent data transmissions of the same packet or message to multiple destinations or target access terminals. A "broadcast" refers to a transmission of data packets to all destinations or access terminals (e.g., within a given cell, served by a given service provider, etc.), while a "multicast" refers to a transmission of data packets to a given group of destinations or access terminals. In an example, the given group of destinations or "multicast group" may include more than one and less than all of possible destinations or access terminals (e.g., within a given group, served by a given service provider, etc.). However, it is at least possible in certain situations that the multicast group comprises only one access terminal, similar to a unicast, or alternatively that the multicast group comprises all access terminals (e.g., within a cell or sector), similar to a broadcast.

Broadcasts and/or multicasts may be performed within wireless communication systems in a number of ways, such as performing a plurality of sequential unicast operations to accommodate the multicast group, allocating a unique broadcast/multicast channel (BCH) for handling multiple data transmissions at the same time and the like. A conventional system using a broadcast channel for push-to-talk communications is described in United States Patent Application Publication No. 2007/0049314 dated Mar. 1, 2007 and entitled "Push-To-Talk Group Call System Using CDMA 1x-EVDO Cellular Network", the contents of which are incorporated herein by reference in its entirety. As described in Publication No. 2007/0049314, a broadcast channel can be used for push-to-talk calls using conventional signaling techniques. Although the use of a broadcast channel may improve bandwidth requirements over conventional unicast techniques, the conventional signaling of the broadcast channel can still result in additional overhead and/or delay and may degrade system performance.

The 3$^{rd}$ Generation Partnership Project 2 ("3GPP2") defines a broadcast-multicast service (BCMCS) specification for supporting multicast communications in CDMA2000 networks. Accordingly, a version of 3GPP2's BCMCS specification, entitled "CDMA2000 High Rate Broadcast-Multicast Packet Data Air Interface Specification", dated Feb. 14, 2006, Version 1.0 C.S0054-A, is hereby incorporated by reference in its entirety.

SUMMARY

Embodiments are directed to monitoring downlink communication at an access terminal within a wireless communications system. The access terminal monitors data on a first downlink broadcast channel of a first network at least with a primary antenna of the access terminal, the monitored data associated with an active communication session (e.g., a high-priority multicast communication session) of the access terminal. The access terminal may optionally periodically monitor messaging information on a downlink channel of a second network with a secondary antenna of the access terminal, the primary antenna having a higher sensitivity than the secondary antenna. The access terminal maintains an exclusive allocation of the primary antenna to the first network irrespective of a quality level of the periodically monitored messaging information on the downlink channel of the second network.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
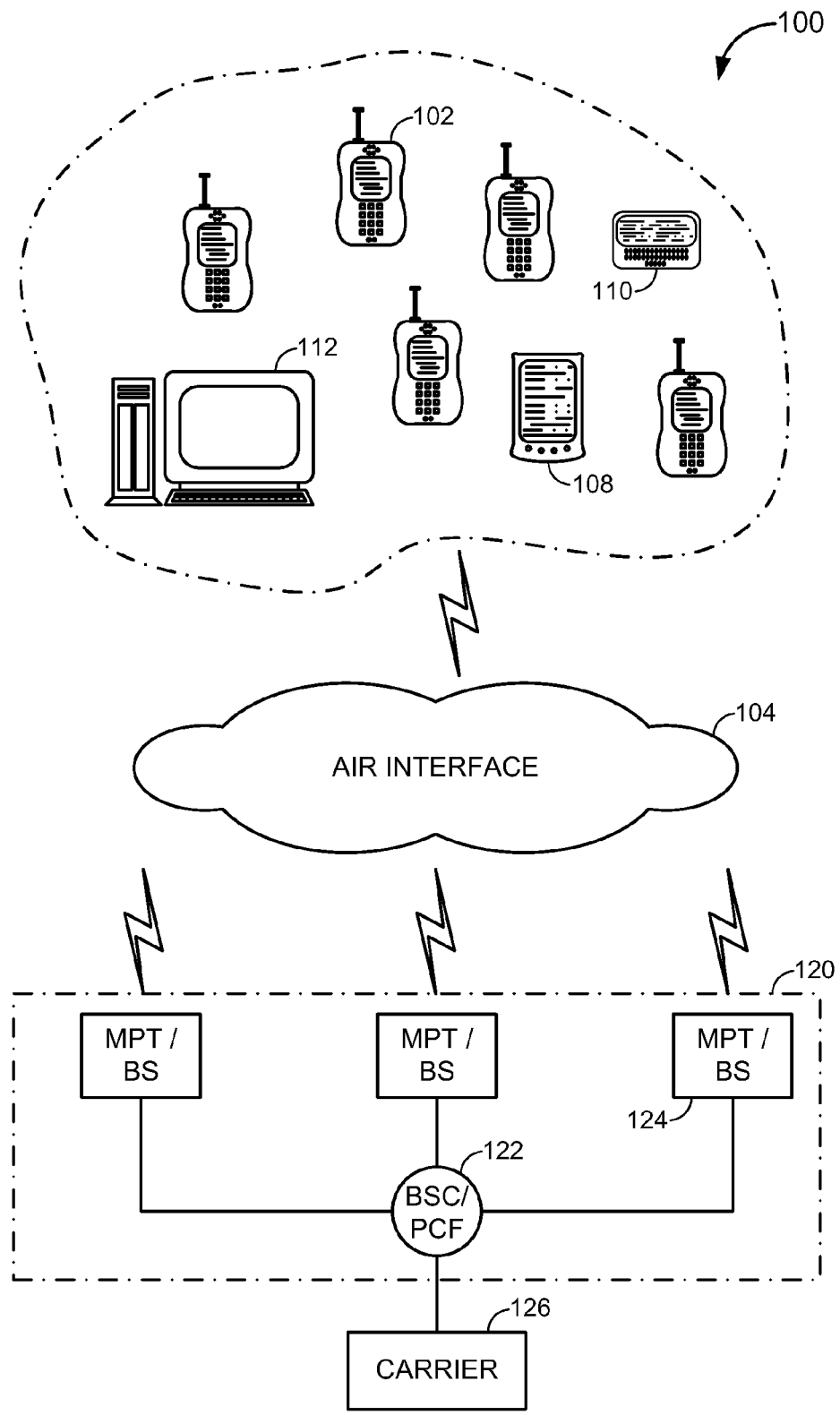
FIG. 1 is a diagram of a wireless network architecture that supports access terminals and access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as an access terminal (AT), may be mobile or stationary, and may communicate with one or more HDR base stations, referred to herein as modem pool transceivers (MPTs) or base stations (BS). An access terminal transmits and receives data packets through one or more modem pool transceivers to an HDR base station controller, referred to as a modem pool controller (MPC), base station controller (BSC) and/or packet control function (PCF). Modem pool transceivers and modem pool controllers are parts of a network called an access network. An access network transports data packets between multiple access terminals.

The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link or traffic channel. The communication link through which a modem pool transceiver sends signals to an access terminal is called a forward link or traffic channel. As used herein the term traffic channel can refer to either a forward or reverse traffic channel.

FIG. 1 illustrates a block diagram of one exemplary embodiment of a wireless system 100 in accordance with at least one embodiment of the invention. System 100 can contain access terminals, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or carrier network 126) and the access terminals 102, 108, 110, 112. As shown here, the access terminal can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the terms "access terminal", "wireless device", "client device", "mobile terminal" and variations thereof may be used interchangeably.

Referring back to FIG. 1, the components of the wireless network 100 and interrelation of the elements of the exemplary embodiments of the invention are not limited to the configuration illustrated. System 100 is merely exemplary and can include any system that allows remote access terminals, such as wireless client computing devices 102, 108, 110, 112 to communicate over-the-air between and among each other and/or between and among components connected via the air interface 104 and RAN 120, including, without limitation, carrier network 126, the Internet, and/or other remote servers.

The RAN 120 controls messages (typically sent as data packets) sent to a base station controller/packet control function (BSC/PCF) 122. The BSC/PCF 122 is responsible for signaling, establishing, and tearing down bearer channels (i.e., data channels) between a packet data service node 160 ("PDSN") and the access terminals 102/108/110/112. If link layer encryption is enabled, the BSC/PCF 122 also encrypts the content before forwarding it over the air interface 104. The function of the BSC/PCF 122 is well-known in the art and will not be discussed further for the sake of brevity. The carrier network 126 may communicate with the BSC/PCF 122 by a network, the Internet and/or a public switched telephone network (PSTN). Alternatively, the BSC/PCF 122 may connect directly to the Internet or external network. Typically, the network or Internet connection between the carrier network 126 and the BSC/PCF 122 transfers data, and the PSTN transfers voice information. The BSC/PCF 122 can be connected to multiple base stations (BS) or modem pool transceivers (MPT) 124. In a similar manner to the carrier network, the BSC/PCF 122 is typically connected to the MPT/BS 124 by a network, the Internet and/or PSTN for data transfer and/or voice information. The MPT/BS 124 can broadcast data messages wirelessly to the access terminals, such as cellular telephone 102. The MPT/BS 124, BSC/PCF 122 and other components may form the RAN 120, as is known in the art. However, alternate configurations may also be used and the invention is not limited to the configuration illustrated. For example, in another embodiment the functionality of the BSC/PCF 122 and one or more of the MPT/BS 124 may be collapsed into a single "hybrid" module having the functionality of both the BSC/PCF 122 and the MPT/BS 124.

Figure 2:
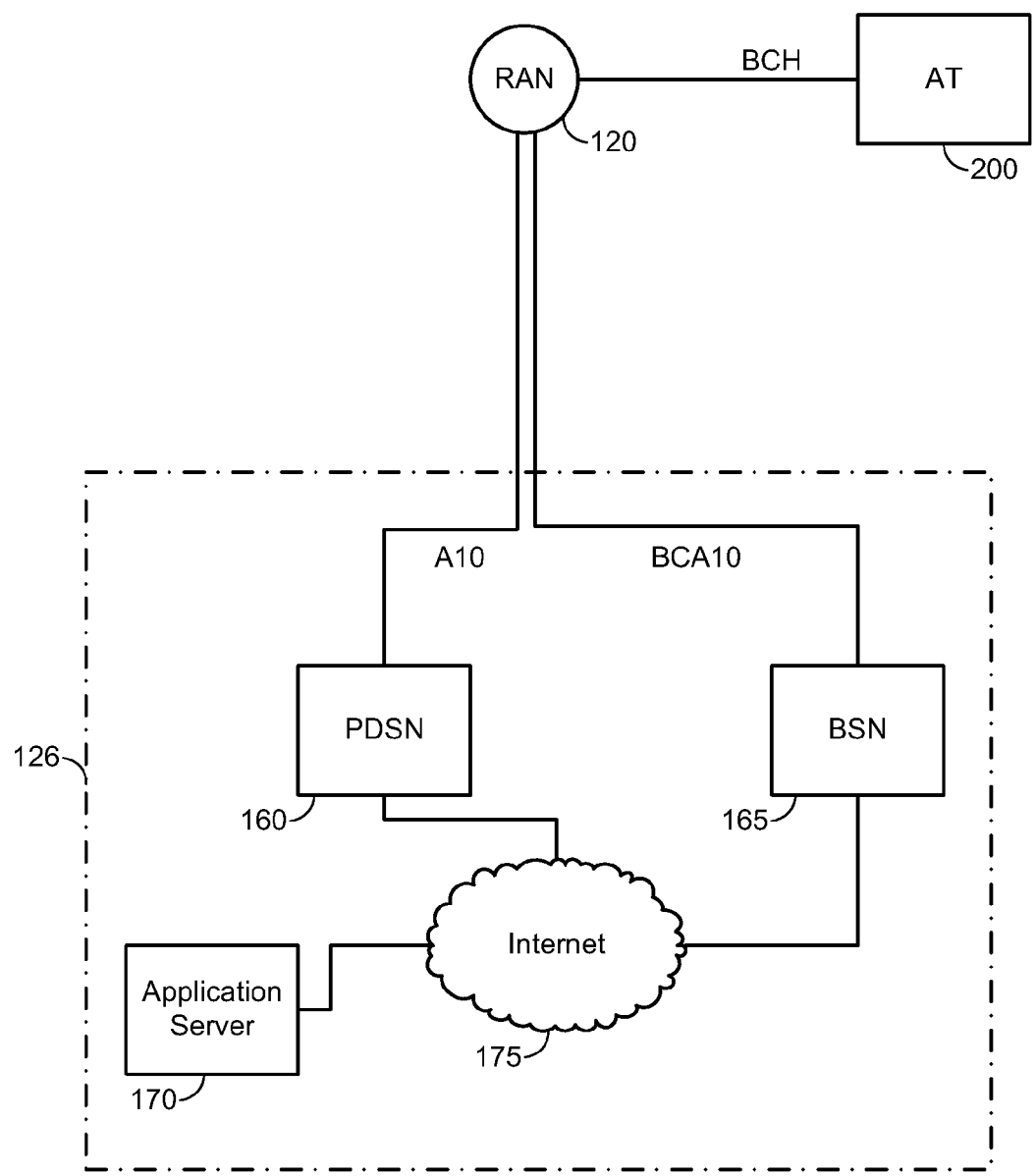
FIG. 2 illustrates the carrier network according to an example embodiment of the present invention.

FIG. 2 illustrates the carrier network 126 according to an embodiment of the present invention. In the embodiment of FIG. 2, the carrier network 126 includes a packet data serving node (PDSN) 160, a broadcast serving node (BSN) 165, an application server 170 and an Internet 175. However, application server 170 and other components may be located outside the carrier network in alternative embodiments. The PDSN 160 provides access to the Internet 175, intranets and/or remote servers (e.g., application server 170) for mobile stations (e.g., access terminals, such as 102, 108, 110, 112 from FIG. 1) utilizing, for example, a cdma2000 Radio Access Network (RAN) (e.g., RAN 120 of FIG. 1). Acting as an access gateway, the PDSN 160 may provide simple IP and mobile IP access, foreign agent support, and packet transport. The PDSN 160 can act as a client for Authentication, Authorization, and Accounting (AAA) servers and other supporting infrastructure and provides mobile stations with a gateway to the IP network as is known in the art. As shown in FIG. 2, the PDSN 160 may communicate with the RAN 120 (e.g., the BSC/PCF 122) via a conventional A10 connection. The A10 connection is well-known in the art and will not be described further for the sake of brevity.

Referring to FIG. 2, the broadcast serving node (BSN) 165 may be configured to support multicast and broadcast services. The BSN 165 will be described in greater detail below. The BSN 165 communicates with the RAN 120 (e.g., the BSC/PCF 122) via a broadcast (BC) A10 connection, and with the application server 170 via the Internet 175. The BCA10 connection is used to transfer multicast and/or broadcast messaging. Accordingly, the application server 170 sends unicast messaging to the PDSN 160 via the Internet 175, and sends multicast messaging to the BSN 165 via the Internet 175.

Generally, as will be described in greater detail below, the RAN 120 transmits multicast messages, received from the BSN 165 via the BCA10 connection, over a broadcast channel (BCH) of the air interface 104 to one or more access terminals 200.

Figure 3A:
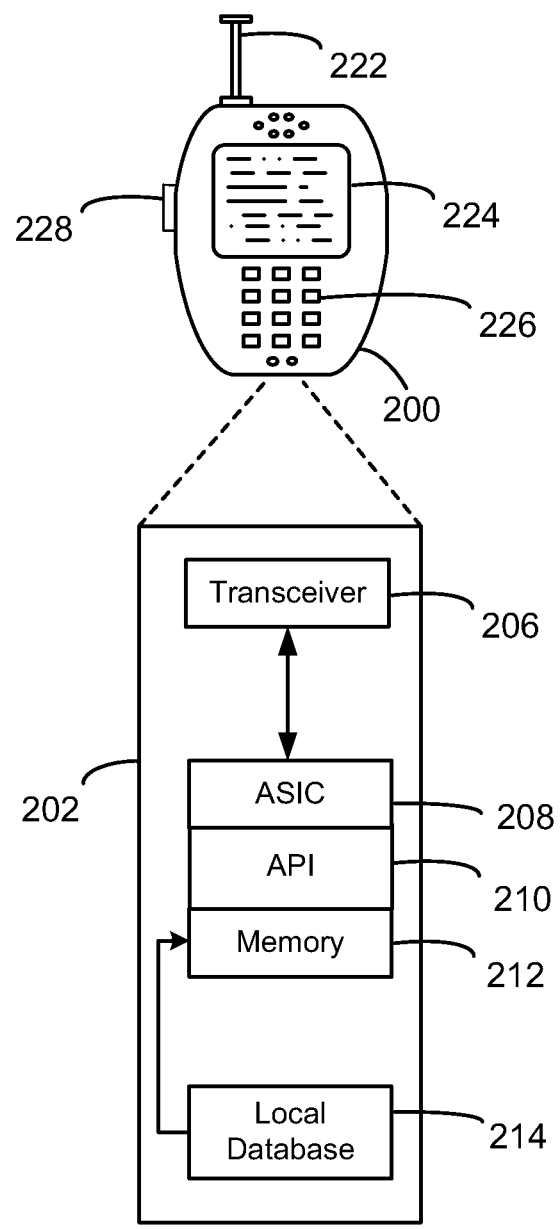
FIG. 3A is an illustration of an access terminal in accordance with at least one embodiment of the invention.

Referring to FIG. 3A, an access terminal 200, (here a wireless device), such as a cellular telephone, has a platform 202 that can receive and execute software applications, data and/or commands transmitted from the RAN 120 that may ultimately come from the carrier network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API") 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include an access terminal including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the access terminal in FIG. 3A are to be considered merely illustrative and the invention is not limited to the illustrated features or arrangement.

The wireless communication between the access terminal 102 and the RAN 120 can be based on different technologies, such as code division multiple access (CDMA), WCDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. The data communication is typically between the client device 102, MPT/BS 124, and BSC/PCF 122. The BSC/PCF 122 can be connected to multiple data networks such as the carrier network 126, PSTN, the Internet, a virtual private network, and the like, thus allowing the access terminal 102 access to a broader communication network. As discussed in the foregoing and known in the art, voice transmission and/or data can be transmitted to the access terminals from the RAN using a variety of networks and configurations. Accordingly, the illustrations provided herein are not intended to limit the embodiments of the invention and are merely to aid in the description of aspects of embodiments of the invention.

Figure 3B:
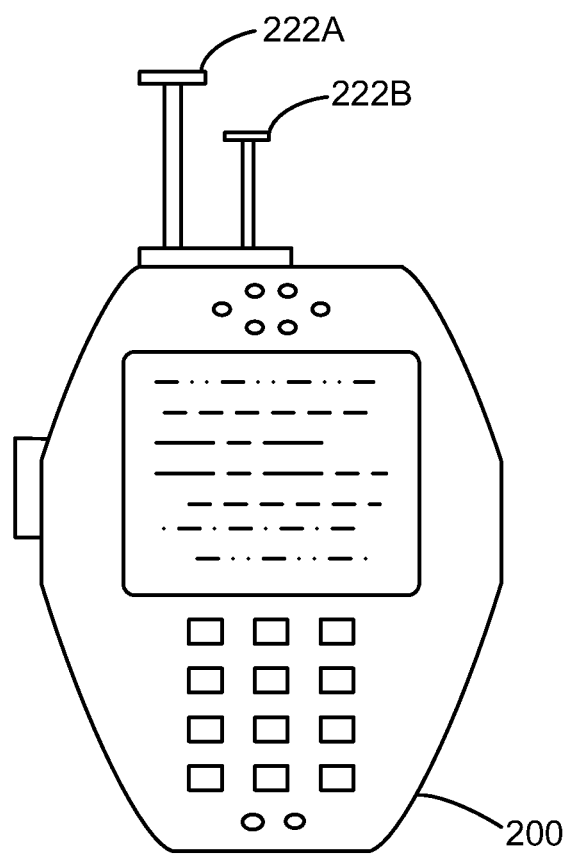
FIG. 3B illustrates a more detailed view of an antenna of the access terminal of FIG. 2 in accordance with at least one embodiment of the invention.

FIG. 3B illustrates a more detailed view of the antenna 222 of the access terminal of FIG. 2 in accordance with at least one embodiment of the invention. In particular, FIG. 3B illustrates a multi-antenna arrangement of the antenna 222. Referring to FIG. 3B, the antenna 222 includes a first antenna 222A and a second antenna 222B. The first and second antennas 222A and 222B are physically separate antennas with different operating characteristics. The first antenna 222A corresponds to a "primary antenna", and the second antenna 222B corresponds to a "secondary antenna". Both the primary and secondary antennas 222A and 222B can be used to tune to downlink transmission from the RAN 120. However, the primary antenna has a higher sensitivity than the secondary antenna, such that a success rate of messages decoded using the first antenna 222A may be higher than the messages decoded using the second antenna 222B (e.g., assuming messages of the same quality are received at both antennas).

Further, the primary and secondary antennas can be used in conjunction such that each antenna tunes to the same downlink transmission, which permits the AT 200 to take advantage of signal diversity so as to obtain a higher success rate for decoding the downlink messages than either antenna could achieve by itself, as is known in the art. In an example, the primary antenna or first antenna 222A may have a sensitivity approximately 3 decibels (dB) higher than the secondary antenna or second antenna 222B. Further, while not illustrated explicitly in FIG. 3B, it is also possible that more than two (2) antennas could be attached to the AT 200. In this case, there may be multiple primary antennas (e.g., antennas having a higher sensitivity than at least one other antenna) and/or multiple secondary antennas (e.g., antennas having a lower sensitivity less than at least one other antenna). Also, while the primary antenna 222A is illustrated as being physically larger than the secondary antenna 222B, the physical size of the antennas need not actually be different so long as the tuning sensitivity of the antennas distinguish from each other such that at least one antenna can be classified as "primary" and at least one other antenna can be classified as "secondary".

While illustrated in FIG. 3B as two antennas, with one of the two antennas being a primary antenna and the other of the two antennas being a secondary antenna, some ATs have antennas configurations that include more than two antennas. In this case, the three or more antennas can be partitioned into antenna groupings or sets, with one of the sets being a primary antenna set and the other of the sets being a secondary antenna set. In this case, two or more antennas may be included in the primary antenna set and/or the secondary antenna set, such that the primary and secondary antenna sets are used together and the antenna set collectively has a higher sensitivity than the secondary antenna set. Thus, when reference is made below to primary and secondary antennas, it will be appreciated that these references can include designations of single-antennas and/or multiple antennas grouped into sets.

It is common for access terminals, such as AT 200, to monitor different types of wireless communication networks. For example, AT 200 can be configured to monitor data and/or other messaging from a first network such as 1× EV-DO, and can also be configured to monitor data and/or other messaging from a second network such as CDMA2000 1×. Accordingly, the manner in which the AT 200 allocates the primary and secondary antennas to the different wireless communication networks can affect the AT 200's decoding performance for the different networks, with a given network's transmission being decoded more successfully at AT 200 if the primary antenna is allocated as compared to the secondary antenna.

Figure 4:
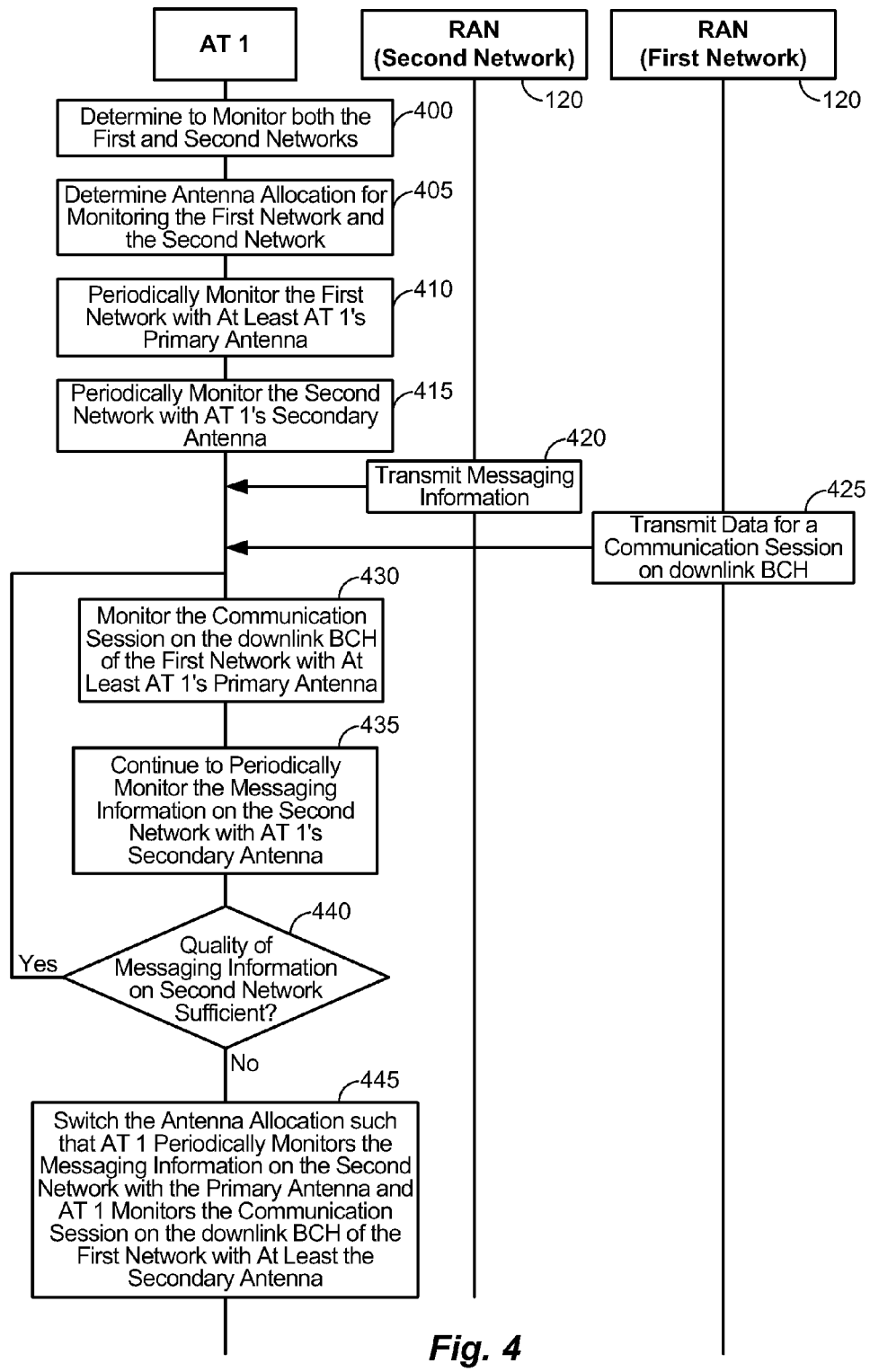
FIG. 4 illustrates a conventional process of allocating multiple antennas of an access terminal during a communication session.

FIG. 4 illustrates a conventional process of allocating the primary and secondary antennas of a given AT ("AT 1") during a communication session. Referring to FIG. 4, AT 1 (e.g., configured as AT 200, as described above) determines to monitor each of a first network operating in accordance with a first wireless telecommunications protocol (e.g., 1× EV-DO) and a second network operating in accordance with a second wireless telecommunications protocol (e.g., CDMA2000 1×), 400. At this point, assume that AT 1 is not engaged in an active communication session on either network.

Next, AT 1 determines a manner of allocating its primary and secondary antennas to the first and second networks, 405. For example, it is common for networks such as 1× EV-DO to be prioritized over other networks, such as CDMA2000 1×. In this case, the antenna allocation can be configured such that the primary antenna is reserved for the 1× EV-DO network during normal-operation (e.g., when the CDMA2000 1× network is maintained above a threshold quality level), while the secondary antenna is used, when necessary, to monitor the CDMA2000 1× network. For example, when no active communication sessions are active on either network, the primary antenna can be used (e.g., either in conjunction with the secondary antenna for signal diversity, or by itself) to periodically monitor a downlink channel of the first network to determine whether AT 1 is being paged by the first network, and also to periodically monitor a downlink channel of the second network to determine whether AT 1 is being paged by the second network. However, if there is a collision such that a paging cycle of the first and second networks overlap in time, the secondary antenna is used to monitor the downlink channel of the second network while the primary antenna is still used to monitor the downlink channel of the first network.

Accordingly, AT 1 periodically monitors the first network with at least AT 1's primary antenna (e.g., and potentially, with the secondary antenna as well for diversity) to determine if AT 1 is being paged by the first network, 410, and AT 1 periodically monitors the second network with AT 1's secondary antenna to determine if AT 1 is being paged by the second network, 415. As noted above, AT 1's use of the secondary antenna to monitor the second network assumes that the primary antenna is being used to monitor the first network, because AT 1 could otherwise use the un-occupied primary antenna briefly in order to monitor the second network. Thus, while 415 indicates that the secondary antenna is used to monitor the second network, it will be appreciated that there are times when this step is actually performed with the primary antenna (e.g., when the first network is not using the primary antenna). In this example, it may be assumed that the first network (e.g., 1× EV-DO) is generally considered to be more important than the second network (e.g., CDMA2000 1×) due to the first network's allocation of the primary antenna.

Next, the RAN 120's second network periodically transmits messaging information that is not associated with an active communication session, 420. In an example, the messaging information may correspond to periodic paging messages that indicate whether AT 1 is being paged. Then, assume that AT 1 establishes a communication session on a downlink broadcast channel (BCH) (e.g., a multicast communication session, etc.) with the RAN 120's first network, such that the RAN 120's first network sends data for the communication session on the downlink BCH to AT 1, 425. From the perspective of AT 1, the data for the communication session can be said to be more important than the paging messages on the second network from 420 if the communication session on the first network is a time-sensitive communication such as push-to-talk (PTT), whereas the paging messages only potentially indicate, to AT 1, that the second network has data for transmission to AT 1. However, as will be described below in more detail, AT 1 does not conventionally take the relative importance of the data monitoring on the broadcast channel (BCH) versus the paging cycle decoding into account in determining whether to re-allocate the primary antenna from the first network to the second network. In part, this is because conventional communication sessions supported by the BCH are, in general, not considered to be very sensitive to temporary decoding performance degradations. For example, if a TV channel is broadcasted on the BCH, losing a few packets does not significantly harm the user experience (e.g., the user may simply experience a brief pixilation and/or audio jitters on the TV channel). Furthermore, conventional broadcast applications for the most part are not particularly delay sensitive, and the RAN 120 often applies strong error correcting codes (e.g., Reed-Solomon Code) to allow successful decoding of entire packets even after losing some packets. This coding scheme could result in a long encoding delay especially when the RS code is applied across multiple packets. As will be appreciated, the conventional techniques applied to more typical BCH applications like media broadcasting can degrade performance on time-sensitive BCH applications (e.g., such as push-to-talk (PTT) sessions).

Accordingly, AT 1 monitors the communication session on the RAN 120's first network with at least AT 1's primary antenna (e.g., and potentially, with the secondary antenna as well for diversity), 430, and also continues to periodically monitor the messaging information (e.g., paging messages at paging cycle intervals) on the second network with AT 1's secondary antenna (e.g., at least, when the primary antenna is used for first network-monitoring), 435. Thus, if AT 1 is actually using the primary and secondary antennas in conjunction to decode the data of the communication session, it is appreciated that the primary antenna is used without the secondary antenna at least during the periods where the secondary antenna tunes to the second network, as in 435.

Next, assume that the quality of the communication session on the first network remains adequate (e.g., a frame error rate (FER), signal-to-noise ratio (SNR) and/or other metric satisfies a given quality metric), and AT 1 then determines whether the quality of the messaging information (e.g., paging messages) on the second network decoded by the secondary antenna is sufficient, 440. In 440, if AT 1 determines that the quality of the messaging information (e.g., paging cycles) decoded by the secondary antenna is sufficient (e.g., equal to or above a threshold level), the process returns to 430 and AT 1 continues to monitor the communication session on the first network with the primary antenna, 430, and to periodically monitor the messaging information (e.g., paging cycles) on the second network with the secondary antenna, 435. Otherwise, if AT 1 determines that the quality of the messaging information (e.g., paging messages) decoded by the secondary antenna is not sufficient (e.g., below the threshold level), AT 1 re-allocates the primary and secondary antennas such that (i) AT 1 periodically monitors the messaging information (e.g., paging messages) on the second network with the primary antenna and (ii) AT 1 monitors the communication session on the first network with at least the secondary antenna, and potentially with the primary antenna when the primary antenna is not being used to decode the messaging information (e.g., paging messages) on the second network.

As will be appreciated by one of ordinary skill in the art, even though the communication session on the first network carries higher-priority data for AT 1, and the paging messages only contain a potential indication that the second network has data for AT 1, the primary antenna is re-allocated away from the first network when the second network's quality degrades below a threshold level. This can, in turn, degrade the performance of the communication session on the first network. Accordingly, embodiments of the invention are directed to maintaining an allocation of a primary antenna to a higher-priority communication session on the broadcast channel (BCH) on a first network irrespective of a quality level of lower-priority messaging information on a second network.

Figure 5A:
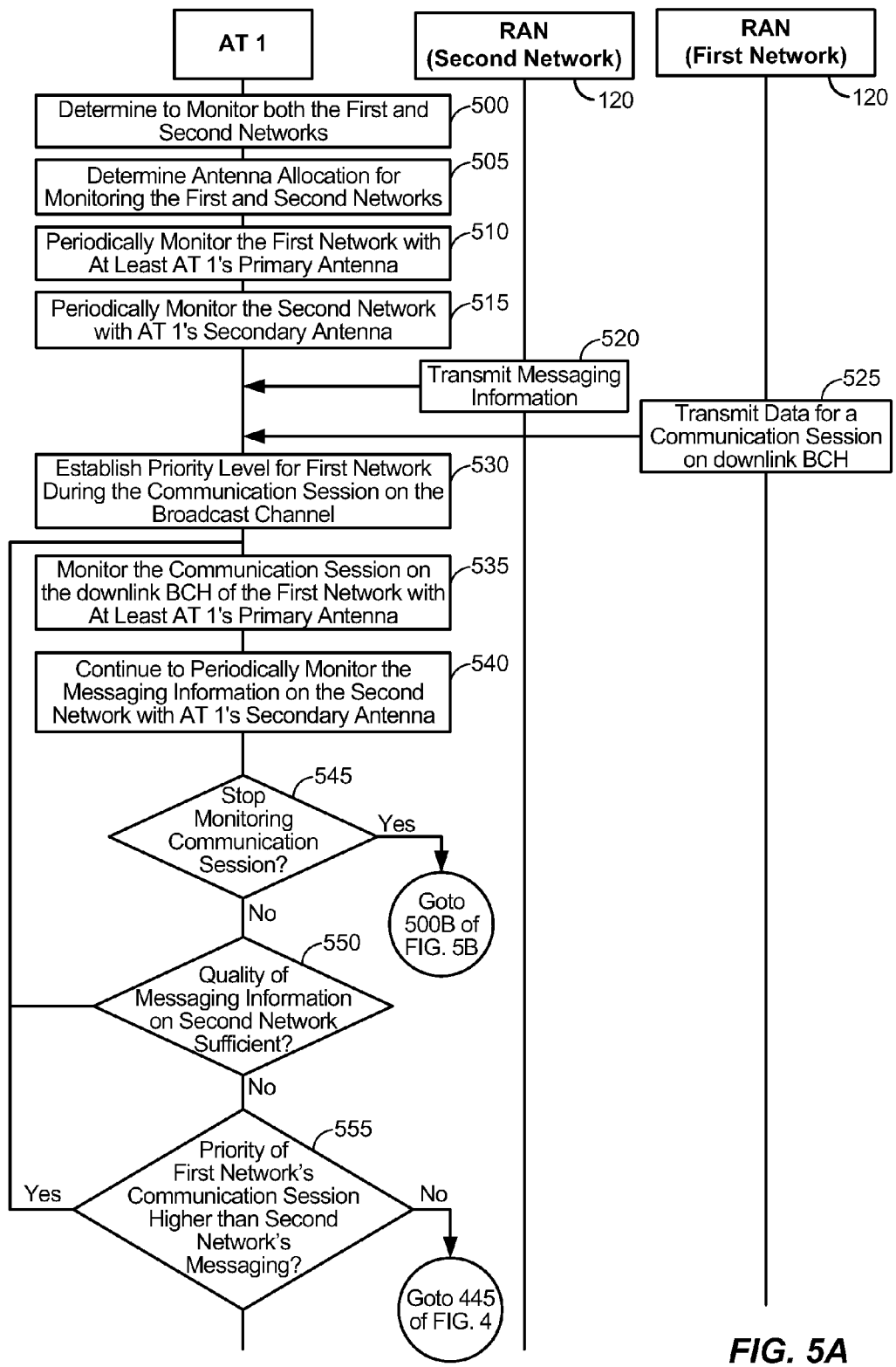
FIG. 5A illustrates a process of allocating multiple antennas of an access terminal during a communication session in accordance with at least one embodiment of the invention.

FIG. 5A illustrates a process of allocating the primary and secondary antennas of AT 1 during a communication session according to an embodiment of the invention. As in FIG. 4, it may be assumed that AT 1 is configured as AT 200 in FIG. 3B, such that AT 1 has a primary antenna with a relatively high-sensitivity, and a secondary antenna with a relatively low-sensitivity.

Referring to FIG. 5A, AT 1 determines to monitor each of a first network operating in accordance with a first wireless telecommunications protocol (e.g., 1× EV-DO) and a second network operating in accordance with a second wireless telecommunications protocol (e.g., CDMA2000 1×), 500. At this point, assume that AT 1 is not engaged in an active communication session on either network.

Next, AT 1 determines a manner of allocating its primary and secondary antennas to the first and second networks, 505. For example, if the first network corresponds to 1× EV-DO and the second network corresponds to CDMA2000 1×, the antenna allocation can be configured such that the primary antenna is reserved for the 1× EV-DO network during normal-operation, while the secondary antenna is used, when necessary, to monitor the CDMA2000 1× x network. For example, when no active communication sessions are active on either network, the primary antenna can be used (e.g., either in conjunction with the secondary antenna for signal diversity, or by itself) to periodically monitor a downlink channel of the first network to determine whether AT 1 is being paged by the first network, while the secondary antenna can be used to periodically monitor a downlink channel of the second network to determine whether AT 1 is being paged by the second network. Again, if there is no overlap with regard to the paging cycles of the first and second networks, the primary antenna can be used to monitor paging cycles on both networks. The example in 515 by which AT 1 monitors the second network with the secondary antenna thereby assumes a certain degree of overlap between the paging cycles on the first and second networks. It will be appreciated that AT 1 will try to use the primary antenna, when possible, to decode the second network's paging cycles, although if there is contention between the first and second networks for the antennas then the primary antenna will be allocated to the first network and the secondary antenna will be allocated to the second network.

Accordingly, AT 1 periodically monitors the first network with at least AT 1's primary antenna (e.g., and potentially, with the secondary antenna as well for diversity) to determine if AT 1 is being paged by the first network, 510, and AT 1 periodically monitors the second network with AT 1's secondary antenna to determine if AT 1 is being paged by the second network (e.g., at least when the primary antenna is being used to monitor the first network), 515. In this example, it may be assumed that the first network (e.g., 1× EV-DO) is generally considered to be more important than the second network (e.g., CDMA2000 1×) due to the first network's allocation of the primary antenna.

Next, the RAN 120's second network periodically transmits messaging information that is not associated with an active communication session on the second network, 520. In an example, the messaging information may correspond to periodic paging messages transmitted at a given paging cycle or interval that indicate whether AT 1 is being paged. Then, while not shown in FIG. 5A, assume that AT 1 establishes a communication session with the RAN 120's first network on the broadcast channel (BCH), such that the RAN 120's first network sends multicast data for the communication session on the downlink broadcast channel (BCH) to AT 1, 525.

As noted above with respect to FIG. 4, from the perspective of AT 1, data associated with an active time-sensitive communication session can be said to have a higher priority than the paging messages on the second network. As noted above, this is because conventional communication sessions supported by the BCH are, in general, not considered to be very sensitive to temporary decoding performance degradations. Thus, the conventional techniques applied to more typical BCH applications (e.g., discussed above in more detail) like media broadcasting can degrade performance on time-sensitive BCH application (e.g., such as push-to-talk (PTT) sessions). However, in FIG. 4, the relative importance or priorities of the different types of downlink messaging conventionally is not taken into account in the determination to perform the antenna switch or re-allocation that occurs in 445.

Returning to FIG. 5A, AT 1 establishes a priority level for the communication session on the first network, 530. In an example, if the communication session on the first network corresponds to a high-priority multicast communication session, AT 1 can set a high-priority multicasting (HPM) flag to a given logic level (e.g., "1" or "0") so that AT 1 will prioritize the communication session on the first network over communication from other networks. In another example, instead of a binary priority level (e.g., "1" or "0"), a more nuanced priority level can be established for the communication session on the first network such that the first network communication session priority can be compared against priorities of communications on other networks.

In an example, the priority level established in 530 can be based on the type of communication being supported for the communication session (e.g., a push-to-talk group call, an emergency data session, a high priority multimedia multicast communication session supported by IP multicasting protocols, etc.). In an alternative example, the priority level established in 530 can be set to a given level for any active communication session irrespective of the network supporting the communication session. In another alternative example, the priority level established in 530 can be set to a given level for any active communication session on a network-specific basis. For example, active communication sessions on the second network may not be granted a high-priority level, whereas active communication sessions on the first network may be granted a high-priority level.

In a further example, the priority level establishment of 530 can be based on the preferences of a user of AT 1. In other words, the priority level need not be set externally (e.g., by the RAN 120 indicating that a call is an emergency call, etc.), but can correspond to the personal preferences of the user of AT 1. Thus, if the user of AT 1 prefers to prioritize a multicast session with a particular multicast group over all other types of communication, the priority level established in 530 corresponds to the user-defined priority level. Alternatively, in the absence of a user-defined 'override' priority level, a default priority level for a particular communication type and/or a network-established priority level can be used in 530.

As will be described below in more detail, a communication session that is allocated either (i) a binary high-priority status (e.g., via a HPM flag for multicast communication sessions) or (ii) a higher priority level than is allocated to other monitored communications at AT 1 will not have its antenna(s) re-allocated to the detriment of the communication session so long as the communication session is active.

Next, AT 1 monitors the communication session on the RAN 120's first network with at least AT 1's primary antenna (e.g., and potentially, with the secondary antenna as well for diversity), 535, and AT 1 also continues to periodically monitor the messaging information (e.g., paging cycles) on the second network with AT 1's secondary antenna, 540. Thus, in an example, if AT 1 is actually using the primary and secondary antennas in conjunction to decode the data of the communication session, it is appreciated that the primary antenna is used without the secondary antenna at least during the periods where the secondary antenna tunes to the second network, as in 540.

Alternatively, while not shown explicitly within FIG. 5A, it is at least possible that step 540 need not be performed. In this case, AT 1 may use the primary and secondary antennas in conjunction to decode the data of the communication session without 'losing' the secondary antenna periodically to search for potential pages of AT 1 on the second network. Thus, in this example, AT 1 ignores the second network altogether so long as the communication session on the first network is active. This embodiment may be triggered either by AT 1 simply having a higher-priority level for the first network's communication session, or alternatively in response to quality degradation of the first network's communication session. Thus, in one embodiment, AT 1 can switch back and forth between monitoring the paging cycles on the second network with the secondary antenna and ignoring the second network altogether based on a quality level of the communication session on the first network.

Next, again assuming that step 540 is performed such that AT 1 periodically tunes the secondary antenna to the second network to check for messaging information (e.g., paging messages indicating potential pages of AT 1), AT 1 determines whether to stop monitoring the communication session on the first network, 545. For example, AT 1 can determine to drop the communication session on the first network if a user of AT 1 presses an "END" button, or if the quality level of the communication session on the first network drops below a threshold required to maintain the session.

If AT 1 determines to stop monitoring the communication session on the first network in 545, the process advances to 500B, which is discussed in more detail below with respect to FIG. 5B. Otherwise, if AT 1 determines to continue monitoring the communication session on the first network in 545, AT 1 determines whether the quality of the messaging information (e.g., paging messages) on the second network decoded by the secondary antenna is sufficient, 550. In 550, if AT 1 determines that the quality of the messaging information (e.g., paging messages) decoded by the secondary antenna is sufficient (e.g., equal to or above a threshold level), the process returns to 535 and AT 1 continues to monitor the communication session on the first network with the primary antenna, 535, and to periodically monitor the messaging information (e.g., paging messages) on the second network with the secondary antenna, 540. Otherwise, if AT 1 determines that the quality of the messaging information (e.g., paging messages) decoded by the secondary antenna is not sufficient (e.g., below the threshold level), the process advances to 555.

Referring to FIG. 5A, in 555, AT 1 determines whether the communication session on the first network has a higher priority than the messaging information on the second network. For example, AT 1 can perform the determination of 555 by comparing the priority level established for the communication session on the first network in 530 with a priority level associated with the messaging information (e.g., paging messages) on the second network. Alternatively, AT 1 can simply check a priority bit or flag (e.g., a HPM flag if the communication session corresponds to a multicast communication session) for the communication session on the first network, and if the priority bit or flag indicates a high-priority status (e.g., by being set to "1" or "0"), then AT 1 determines the communication session on the first network to have a higher priority than the messaging information on the second network. In this case, setting the priority bit or flag to high-priority status guarantees that an allocation of the primary antenna to the communication session will be uninterrupted so long as the communication session is active.

Accordingly, if AT 1 determines that the communication session on the first network has a higher priority than the messaging information on the second network, the process returns to 535 and the antenna allocation remains unchanged despite the quality level of the messaging information on the second network being insufficient. In other words, the messaging information on the second network is sacrificed for the benefit of the communication session on the first network.

Alternatively, even if unlikely, it is at least theoretically possible that the second network's messaging information could be allocated a higher priority than the first network's communication. In this case, AT 1 determines that the communication session on the first network does not have a higher priority than the messaging information on the second network, and the process advances to 445 of FIG. 4 and the antenna allocation switch is performed.

Figure 5B:
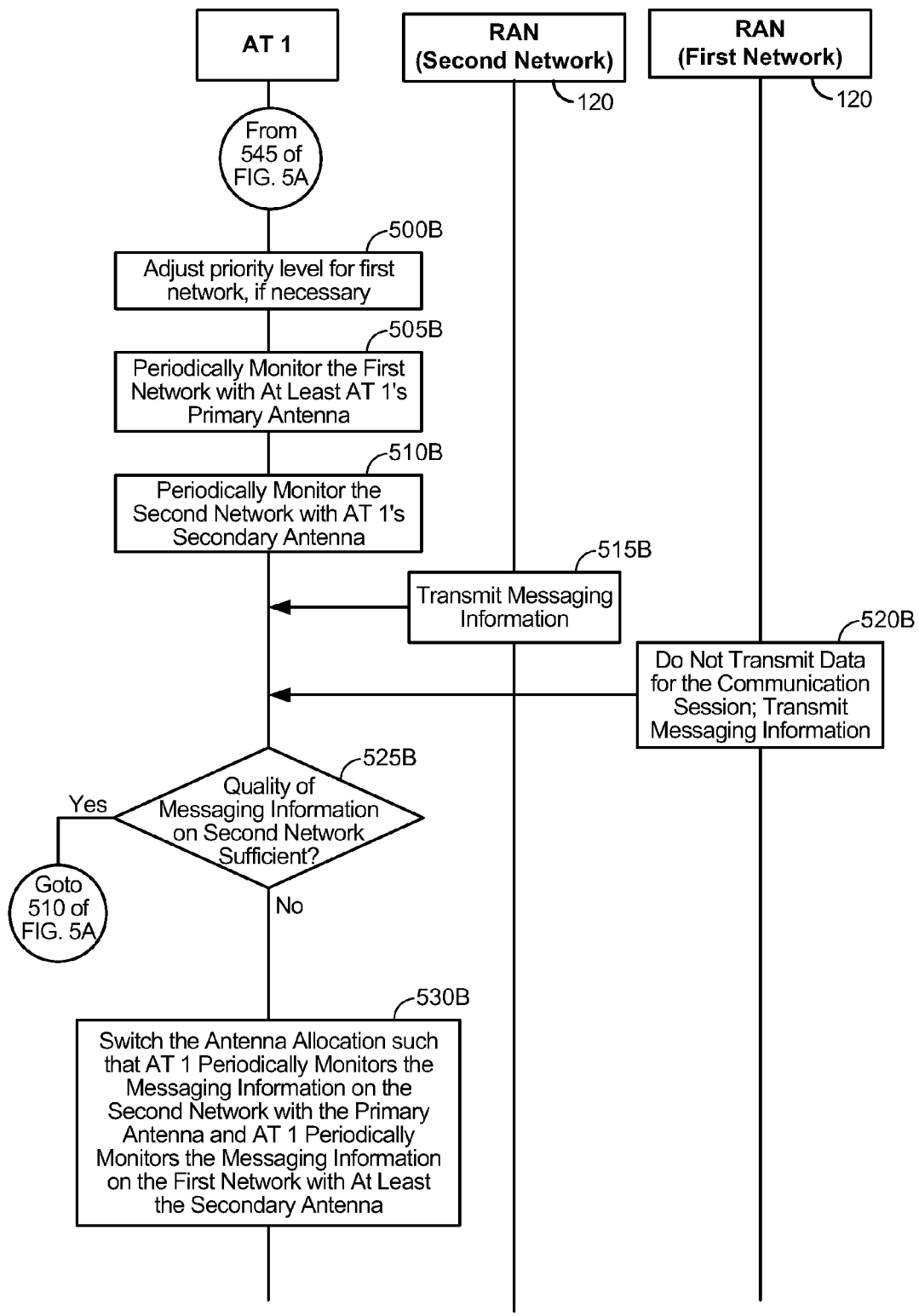
FIG. 5B illustrates a process or re-allocating the multiple antennas of the access terminal after the communication session of FIG. 5A terminates in accordance with at least one embodiment of the invention.

Referring now to FIG. 5B, after AT 1 determines to stop monitoring the communication session on the first network (e.g., in 545 of FIG. 5A), AT 1 adjusts the priority level for the first network that was previously established in 530 of FIG. 5A, if necessary, 500B. For example, if the communication session corresponds to a multicast communication session with a HPM flag set to indicate high-priority (e.g., "1") in 530, then the HPM flag can be reset to another logic level (e.g., "0") to reflect that the multicast communication session is no longer active in 500B. In any case, the priority level in 500B will be adjusted to indicate a lower level of priority for the first network as compared to when the first network was carrying an active communication session for AT 1.

AT 1 again periodically monitors the first network with at least AT 1's primary antenna (e.g., and potentially, with the secondary antenna as well for diversity) to determine if AT 1 is being paged by the first network, 505B, and AT 1 periodically monitors the second network with AT 1's secondary antenna to determine if AT 1 is being paged by the second network (e.g., at least when the primary antenna is not available), 510B. As will be appreciated, 505B and 510B of FIG. 5B may generally correspond to 510 and 515 of FIG. 5A, respectively.

Accordingly, the first network transmits messaging information (e.g., paging messages), 515B, and the second network stops transmitting data for the communication session and also transmits messaging information (e.g., paging messages), 520B. In 525B, AT 1 determines whether the quality of the messaging information (e.g., paging messages) on the second network decoded by the secondary antenna is sufficient (e.g., for simplicity, it is again assumed that the quality level of messaging on the first network remains satisfactory). In 525B, if AT 1 determines that the quality of the messaging information (e.g., paging messaging) decoded by the secondary antenna is sufficient (e.g., equal to or above a threshold level), the process returns to 510 of FIG. 5A and AT 1 continues to periodically monitor paging cycles on the first network via the primary antenna, 510, and to periodically monitor paging cycles on the second network with the secondary antenna (e.g., unless there is no paging cycle collision between the first and second networks such that the primary antenna is available for decoding the paging message on the second network), 515.

Otherwise, if AT 1 determines that the quality of the messaging information (e.g., paging messages) decoded by the secondary antenna is not sufficient (e.g., below the threshold level), the process advances to 530B, and AT 1 adjusts the allocation of the primary and secondary antennas such that the primary antenna is allocated to the second network and the secondary antenna is allocated to the first network.

Further, while certain embodiments describe the active communication session as corresponding to a multicast communication session, it will be appreciated that other embodiments can correspond to any half-duplex communication session wherein the access terminal ("AT 1") is configured to monitor data on a downlink broadcast channel (BCH) of a given network and is not configured to transmit data on a reverse link channel of the given network for transmission to one or more other participants.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of monitoring downlink communication at an access terminal within a wireless communications system, comprising:
  monitoring data on a first downlink channel of a first network at least with a primary antenna of the access terminal, the data associated with an active communication session in which the access terminal is participating;
  periodically monitoring messaging information on a downlink channel of a second network with a secondary antenna of the access terminal, the primary antenna having a higher sensitivity than the secondary antenna;
  maintaining an exclusive allocation of the primary antenna to the first network so long as the access terminal continues participation in the active communication session irrespective of whether or not a quality level of the periodically monitored messaging information on the downlink channel of the second network falls below a threshold;
  determining that the access terminal has ended participation in the active communication session; and
  ending the exclusive allocation, in response to the determination, by permitting re-allocation of the primary antenna to the second network to assist in the periodically monitoring if the quality level of the periodically monitored messaging information on the downlink channel of the second network falls below the threshold.

2. The method of claim 1, wherein the first network corresponds to a 1× EV-DO network, and the second network corresponds to a CDMA2000 1× network.

3. The method of claim 1, wherein the monitoring on the first downlink channel of the first network monitors the data on the first downlink channel of the first network only with the primary antenna.

4. The method of claim 1, wherein the monitoring on the first downlink channel of the first network monitors the data on the first downlink channel of the first network only with the primary antenna when the periodically monitoring is being performed, and
  wherein the monitoring of the first downlink channel of the first network monitors the data on the first downlink channel of the first network with (i) the primary antenna and (ii) the secondary antenna based on diversity, when the periodically monitoring is not being performed.

5. The method of claim 1, wherein the active communication session corresponds to a multicast communication session.

6. The method of claim 1, wherein the active communication session is a half-duplex group communication session and the access terminal is configured to monitor the data on the first downlink channel of the first network and is not configured to transmit other data on a reverse link channel of the first network for transmission to other group participants.

7. The method of claim 1, further comprising:
  re-allocating, in response to the determination, the primary antenna to the second network to assist in the periodically monitoring if (i) the access terminal determines to stop monitoring the active communication session and (ii) the quality level of the periodically monitored messaging information on the downlink channel of the second network falls below the threshold.

8. The method of claim 1, wherein the maintaining includes:
  establishing a first priority level for the first network at least for a duration of the active communication session.

9. The method of claim 8, wherein the first priority level is higher than a second priority level of the second network.

10. The method of claim 9, wherein the maintaining is performed by:
comparing the first priority level with the second priority level; and
determining not to re-allocate the primary antenna to the second network based on the comparing.

11. The method of claim 8, wherein the first priority level is a high priority level that functions to disable re-allocation of the primary antenna away from the first network.

12. The method of claim 8, further comprising:
establishing a second priority level for the first network after the access terminal stops monitoring the active communication session on the first downlink channel of the first network.

13. The method of claim 12, wherein the ending occurs after the second priority level is established for the first network.

14. The method of claim 13, further comprising:
re-allocating the primary antenna to the second network to assist in the periodically monitoring after the ending if the quality level of the periodically monitored messaging information on the downlink channel of the second network falls below the threshold.

15. The method of claim 1, further comprising:
stopping the monitoring of the first downlink channel of the first network after the active communication session is over;
continuing the periodically monitoring of the downlink channel of the second network with the secondary antenna of the access terminal; and
periodically monitoring messaging information on a second downlink channel of the first network with the primary antenna of the access terminal.

16. The method of claim 1, wherein the periodically monitored messaging information on the downlink channel of the second network corresponds to one or more paging cycles that indicate whether the second network is paging the access terminal.

17. The method of claim 1, further comprising:
if a given quality level of the data drops below a given threshold level during the active communication session,
stopping the periodically monitoring; and
modifying the monitoring on the first downlink channel of the first network such that the data on the first downlink channel of the first network is monitored by both (i) the primary antenna and (ii) the secondary antenna based on diversity.

18. The method of claim 1, wherein the quality level of the periodically monitored messaging information on the downlink channel of the second network is based on at least one of a measured frame error rate (FER), a measured signal-to-noise ratio (SNR) or a measured signal strength.

19. The method of claim 1,
wherein the quality level of the periodically monitored messaging information on the downlink channel of the second network is poor, and
wherein the exclusive allocation of the primary antenna to the first network is maintained despite the poor quality level so long as the access terminal continues participation in the active communication session.

20. An access terminal configured to monitor a downlink communication within a wireless communications system, comprising:
means for monitoring data on a first downlink channel of a first network at least with a primary antenna of the access terminal, the data associated with an active communication session in which the access terminal is participating;
means for periodically monitoring messaging information on a downlink channel of a second network with a secondary antenna of the access terminal, the primary antenna having a higher sensitivity than the secondary antenna;
means for exclusive allocation of the primary antenna to the first network so long as the access terminal continues participation in the active communication session irrespective of whether or not a quality level of the periodically monitored messaging information on the downlink channel of the second network falls below a threshold;
means for determining that the access terminal has ended participation in the active communication session; and
means for ending the exclusive allocation, in response to the determination, by permitting re-allocation of the primary antenna to the second network to assist in the periodically monitoring if the quality level of the periodically monitored messaging information on the downlink channel of the second network falls below the threshold.

21. The access terminal 20, wherein the first network corresponds to a 1× EV-DO network, and the second network corresponds to a CDMA2000 1× network.

22. The access terminal 20, wherein the means for monitoring monitors the data on the first downlink channel of the first network only with the primary antenna.

23. The access terminal 20, wherein the means for monitoring monitors the data on the first downlink channel of the first network only with the primary antenna when the periodically monitoring is being performed, and
wherein the means for monitoring monitors the data on the first downlink channel of the first network with (i) the primary antenna and (ii) the secondary antenna based on diversity, when the periodically monitoring not being performed.

24. The access terminal 20, wherein the active communication session corresponds to a multicast communication session.

25. The access terminal 20, wherein the active communication session is a half-duplex group communication session and the access terminal is configured to monitor the data on the first downlink channel of the first network and is not configured to transmit other data on a reverse link channel of the first network for transmission to other group participants.

26. The access terminal 20, further comprising:
mean for re-allocating, in response to the determination, the primary antenna to the second network to assist in the periodically monitoring if (i) the access terminal determines to stop monitoring the active communication session and (ii) the quality level of the periodically monitored messaging information on the downlink channel of the second network falls below the threshold.

27. The access terminal 20, wherein the means for maintaining includes:
means for establishing a first priority level for the first network at least for a duration of the active communication session.

28. The access terminal 27, wherein the first priority level is higher than a second priority level of the second network.

29. The access terminal 28, wherein the means for maintaining includes:
means for comparing the first priority level with the second priority level; and
means for determining not to re-allocate the primary antenna to the second network based on the comparing.

30. The access terminal 27, wherein the first priority level is a high priority level that functions to disable re-allocation of the primary antenna away from the first network.

31. The access terminal 27, further comprising:
means for establishing a second priority level for the first network after the means for monitoring stops monitoring the active communication session.

32. The access terminal 31, wherein the means for ending ends the exclusive allocation after the second priority level is established for the first network.

33. The access terminal 32, further comprising:
means for re-allocating the primary antenna to the second network to assist in the periodically monitoring after the means for ending ends the exclusive allocation if the quality level of the periodically monitored messaging information on the downlink channel of the second network falls below the threshold.

34. The access terminal 20, further comprising:
means for stopping the monitoring of the means for monitoring after the active communication session is over;
means for continuing the periodically monitoring of the downlink channel of the second network with the secondary antenna of the access terminal; and
means for periodically monitoring messaging information on a second downlink channel of the first network with the primary antenna of the access terminal.

35. The access terminal 20, wherein the periodically monitored messaging information on the downlink channel of the second network corresponds to one or more paging cycles that indicate whether the second network is paging the access terminal.

36. The access terminal 20, further comprising:
if a given quality level of the data drops below a given threshold level during the active communication session,
means for stopping the periodically monitoring; and
means for modifying the monitoring such that the data on the first downlink channel of the first network is monitored by both (i) the primary antenna and (ii) the secondary antenna based on diversity.

37. The access terminal 20, wherein the quality level of the periodically monitored messaging information on the downlink channel of the second network is based on at least one of a measured frame error rate (FER), a measured signal-to-noise ratio (SNR) or a measured signal strength.

38. An access terminal configured to monitor a downlink communication within a wireless communications system, comprising:
a processor coupled to a transceiver and configured to:
monitor data on a first downlink channel of a first network at least with a primary antenna of the access terminal, the data associated with an active communication session in which the access terminal is participating;
periodically monitor messaging information on a downlink channel of a second network with a secondary antenna of the access terminal, the primary antenna having a higher sensitivity than the secondary antenna;
maintain an exclusive allocation of the primary antenna to the first network so long as the access terminal continues participation in the active communication session irrespective of whether or not a quality level of the periodically monitored messaging information on the downlink channel of the second network falls below a threshold;
determine that the access terminal has ended participation in the active communication session; and
end the exclusive allocation, in response to the determination, by permitting re-allocation of the primary antenna to the second network to assist in the periodically monitoring if the quality level of the periodically monitored messaging information on the downlink channel of the second network falls below the threshold.

39. A non-transitory computer-readable storage medium containing instructions stored thereon, which, when executed by an access terminal configured to monitor a downlink communication within a wireless communications system, cause the access terminal to perform operations, the instructions comprising:
program code to monitor data on a first downlink channel of a first network at least with a primary antenna of the access terminal, the data associated with an active communication session in which the access terminal is participating;
program code to periodically monitor messaging information on a downlink channel of a second network with a secondary antenna of the access terminal, the primary antenna having a higher sensitivity than the secondary antenna;
program code to maintain an exclusive allocation of the primary antenna to the first network so long as the access terminal continues participation in the active communication session irrespective of whether or not a quality level of the periodically monitored messaging information on the downlink channel of the second network falls below a threshold;
program code to determine that the access terminal has ended participation in the active communication session; and
program code to end the exclusive allocation, in response to the determination, by permitting re-allocation of the primary antenna to the second network to assist in the periodically monitoring if the quality level of the periodically monitored messaging information on the downlink channel of the second network falls below the threshold.

* * * * *